US012764541B2

(12) United States Patent
Han et al.

(10) Patent No.: US 12,764,541 B2
(45) Date of Patent: Oct. 13, 2026

(54) DEFENDING AGAINST WI-FI SPOOFING ATTACKS

(71) Applicant: UNIVERSITY OF SOUTH FLORIDA, Tampa, FL (US)

(72) Inventors: Xiao Han, Tampa, FL (US); Yao Liu, Tampa, FL (US); Zhuo Lu, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 69 days.

(21) Appl. No.: 18/892,162

(22) Filed: Sep. 20, 2024

(65) Prior Publication Data

US 2025/0097710 A1 Mar. 20, 2025

Related U.S. Application Data

(60) Provisional application No. 63/584,069, filed on Sep. 20, 2023, provisional application No. 63/584,060, filed on Sep. 20, 2023.

(51) Int. Cl.
*H04W 12/122* (2021.01)

(52) U.S. Cl.
CPC ................................. *H04W 12/122* (2021.01)

(58) Field of Classification Search
CPC ........... H04W 8/005; H04W 12/00516; H04W 12/06; H04W 12/08; H04W 12/10; H04W 12/12; H04W 12/1202; H04W 48/20; H04L 63/08; H04L 63/101; H04L 63/12; H04L 63/14; H04L 63/1408; H04L 63/1466; H04L 63/1483
See application file for complete search history.

(56) References Cited

U.S. PATENT DOCUMENTS 9,578,458 B2 * 2/2017 Pan ........................ H04W 4/023
9,882,931 B1 * 1/2018 Harmon .............. H04W 12/128
(Continued)

OTHER PUBLICATIONS

Tian et al. "Wasserstein Metric-Based Location Spoofing Attack Detection inWiFi Positioning Systems" [Online], Apr. 7, 2021 [Retrieved on: Jan. 24, 2026], Hindawi Security and Communication Networks vol. 2021, Retrieved from: < https://onlinelibrary.wiley.com/doi/epdf/10.1155/2021/8817569 > (Year: 2021).*
(Continued)

*Primary Examiner* — Eric W Shepperd
(74) *Attorney, Agent, or Firm* — HUSCH BLACKWELL LLP

(57) ABSTRACT

In accordance with some embodiments, various examples of systems, methods, and media for detecting falsified Wi-Fi signals. A system detects a group of nearby access points (APs) broadcasting Wi-Fi signals. A determination is made whether the group of nearby APs contains at least one falsified Wi-Fi signal. Whenever it is determined that the group of nearby APs does contains at least one falsified Wi-Fi signal, an analysis is performed of each AP of the group of nearby APs. The analysis uses at least one of: a pair-wise comparison of AP locations, or an analysis of physical layer attributes of the signals broadcasted by the
(Continued)

APs. APs of the group of nearby APs are identified that are falsified. A mitigation action is initiated relative to the falsified APs that are identified.

17 Claims, 7 Drawing Sheets

(56) References Cited

U.S. PATENT DOCUMENTS

| | | | | |
|---|---|---|---|---|
| 10,602,462 | B1 * | 3/2020 | Cheaz | H04W 52/343 |
| 11,041,933 | B2 * | 6/2021 | Kumar | H04L 63/107 |
| 11,057,398 | B2 | 7/2021 | Kaushik | |
| 11,751,070 | B2 * | 9/2023 | Hassan | G06F 21/552 370/252 |
| 2006/0240840 | A1 * | 10/2006 | Morgan | G01S 5/0205 455/456.1 |
| 2010/0172259 | A1 * | 7/2010 | Aggarwal | H04W 12/122 370/252 |
| 2015/0088272 | A1 * | 3/2015 | Drew | F24F 11/47 700/12 |
| 2015/0341358 | A1 * | 11/2015 | Borovikov | H04W 12/08 726/27 |
| 2021/0333411 | A1 * | 10/2021 | Gum | G01S 19/215 |

OTHER PUBLICATIONS

Le et al. "Rogue Access Point Detection and Localization" [Online], Nov. 29, 2012[Retrieved on: Jan. 24, 2026], 2012 IEEE PIMRC, Retrieved from: < https://ieeexplore.ieee.org/stamp/stamp.jsp?tp=&arnumber=6362775 > (Year: 2012).*

Han, Xiao, et al. "Location heartbleeding: The rise of Wi-Fi spoofing attack via geolocation API." Proceedings of the 2022 ACM SIGSAC Conference on Computer and Communications Security. (2022). 15 Pages.

Han, Xiao, et al. "The Perils of Wi-Fi Spoofing Attack Via Geolocation API and its Defense." IEEE Transactions on Dependable and Secure Computing (2024). 17 Pages.

Tippenhauer, Nils Ole, et al. "Attacks on public WLAN-based positioning systems." Proceedings of the 7th international conference on Mobile systems, applications, and services. (2009): 11 pages.

Liu, Shinan, et al. "Stars can tell: A robust method to defend against {GPS} spoofing attacks using off-the-shelf chipset." 30th USENIX Security Symposium (USENIX Security 21). (2021): 19 pages.

Hua, Jingyu, et al. "Accurate and efficient wireless device fingerprinting using channel state information." IEEE INFOCOM 2018—IEEE Conference on Computer Communications. IEEE, (2018): 9 pages.

Jana, Suman, and Sneha Kumar Kasera. "On fast and accurate detection of unauthorized wireless access points using clock skews." Proceedings of the 14th ACM international conference on Mobile computing and networking. (2010): 14 pages.

Zeng, Kexiong Curtis, et al. "All your {GPS} are belong to us: Towards stealthy manipulation of road navigation systems." 27th USENIX security symposium (USENIX security 18). (2018): 19 pages.

Narain, Sashank, Aanjhan Ranganathan, and Guevara Noubir. "Security of GPS/INS based on-road location tracking systems." 2019 IEEE Symposium on Security and Privacy (SP). IEEE, (2019): 15 pages.

Tadayon et al., "Decimeter Ranging With Channel State Information," in IEEE Transactions on Wireless Communications, TWC, 1-15 pages, 2019.

* cited by examiner

```
{
  "considerip": "false",
  "wifiAccessPoints": [
    {
      "macAddress": "00:24:7C:XX:XX:99"

    },
    {
      "macAddress": "00:24:7C:XX:XX:0A"

    }
  ]
}
```

(a) Range-free mode

```
{
  "considerip": "false",
  "wifiAccessPoints": [
    {
      "macAddress": "00:24:7C:XX:XX:99",
      "signalStrength": -45
    },
    {
      "macAddress": "00:24:7C:XX:XX:0A",
      "signalStrength": -55
    }
  ]
}
```

(b) Range-based mode

FIG. 5

Distributions d = 1 meter d = 10 meters

DEFENDING AGAINST WI-FI SPOOFING ATTACKS

CROSS-REFERENCE TO RELATED APPLICATIONS

The present application is based on, claims priority to, and incorporates herein by reference in their entirety for all purposes, U.S. Provisional Patent Application Ser. No. 63/584,069, filed Sep. 20, 2023, and U.S. Provisional Patent Application Ser. No. 63/584,060, filed Sep. 20, 2023.

STATEMENT REGARDING FEDERALLY SPONSORED RESEARCH

N/A

BACKGROUND

Wi-Fi localization systems have been commercialized and widely used as a complement to conventional global positioning system (GPS). Specifically, a mobile device relies on its 802.11a/b/g compatible wireless interface to collect Wi-Fi information, e.g., Medium Access Control (MAC) addresses about Wi-Fi access points (APs) in its vicinity. The mobile device sends this information to a Wi-Fi localization system, which then looks up a database table that maps collections of Wi-Fi information to geographic locations and replies to the mobile device with a corresponding location.

Spoofing attacks against Wi-Fi localization systems have been studied for over a decade. The basic idea is simple and straightforward. In particular, when at location B, an attacker broadcasts the Wi-Fi information collected from location A. Consequently, a mobile device at location B is deceived and obtains a wrong position estimate of location A from the Wi-Fi localization system. Research and practice show that this type of spoofing attack is easy to implement and seems to be effective. For example, the SkyLift is a low-cost Wi-Fi device that spoofs locations by using Wi-Fi microchip ESP8266. In dense urban environments, where may Wi-Fi APs are present, single-AP spoofing attacks may fail to trick a device into perceiving its current location is actually a location far away, given that the current location is covered by multiple Wi-Fi APs, though some effect will still occur.

The reason for this is that traditional or single-AP attacks assume that the victim device is located in environments surrounded by few visible Wi-Fi APs (i.e., less than 5), but in practice a victim device normally receives Wi-Fi information from both the attacker and dozens of legitimate APs nearby, and reports all collected Wi-F information to the Wi-Fi localization system. This means that the existence of many legitimate APs can significantly interfere with the attacker's fake information in the decision-making process at the Wi-Fi localization system, leading to the failure of the Wi-Fi spoofing attacks in dense urban areas.

However, while traditional single-AP Wi-Fi spoofing attacks may not be effective in significantly deceiving mobile devices in urban areas due to the high number of legitimate Wi-Fi access points nearby, there are several remaining concerns: first, it is reasonable to assume attackers will adjust their approaches and utilize more APs in spoofing attacks or other similar adjustments; second, when victim devices are located in areas that have relatively few APs (e.g., rural, underground, areas with interference, etc.) they will still be susceptible to traditional approaches; and third, it should be assumed that victim devices will or could be in motion, such that the number and composition of legitimate vs illegitimate can change and at times even minor impacts to location determinations could cause harm (e.g., routing an autonomous vehicle to or away from a given turn or route at key moments).

One way that attackers may attempt to improve the success rate of such attacks, is by creating physical-layer jamming to eliminate Wi-Fi signals from legitimate APs. However, this method by itself may not always work, since the victim device may detect the presence of jamming signals or move into range of non-jammed signals. Jamming signals on Wi-Fi bands can also significantly increase the chance for an attacker to be detected.

Other ways that attackers may attempt to improve their chances of success may involve spoofing the location of multiple APs, or varying the number of APs on which they deploy location-spoofed Wi-Fi signals in dense environments, or to target more sparse environments such as while a victim is in motion (e.g., travelling in a car, train, airplane, bus, etc.). Some attackers may even leverage a victim's detection countermeasures to generate a secondary attack, such as a denial of service type attack.

As further described below, the present disclosure provides systems and methods that are able to detect location-spoofed Wi-Fi signals using a complement of several approaches so as to better ensure detection of improved/evolving attack methods.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the following disclosure can provide a system for detecting falsified Wi-Fi signals. The system can include a network interface, including a transceiver configured to communicate via packetized information via a Wi-Fi protocol. The system can include a processor and a memory having stored thereon a set of instruction which, when executed by the processor, can cause the system to detect a group of nearby access points (APs) broadcasting Wi-Fi signals. A determination can be made whether the group of nearby APs contains at least one falsified Wi-Fi signal. Whenever it is determined that the group of nearby APs does contains at least one falsified Wi-Fi signal, an analysis can be performed of each AP of the group of nearby APs. The analysis can use at least one of: a pair-wise comparison of AP locations, or an analysis of physical layer attributes of the signals broadcasted by the APs. APs of the group of nearby APs can be identified that are falsified. A mitigation action can be initiated relative to the falsified APs that are identified.

In other aspects, the following disclosure can provide a method for detecting falsified Wi-Fi signals. A group of nearby access points (APs) broadcasting Wi-Fi signals can be detected. A determination can be made whether the group of nearby APs contains at least one falsified Wi-Fi signal.

Whenever it is determined that the group of nearby APs does contains at least one falsified Wi-Fi signal, an analysis can be performed of each AP of the group of nearby APs. The analysis can use at least one of: a pair-wise comparison of AP locations, or an analysis of physical layer attributes of the signals broadcasted by the APs. APs of the group of nearby APs can be identified that are falsified. A mitigation action can be initiated relative to the falsified APs that are identified.

These and other aspects of the disclosure will become more fully understood upon a review of the drawings and the detailed description, which follows. Other aspects, features, and embodiments of the present disclosure will become apparent to those skilled in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. Similarly, while example embodiments may be discussed below as devices, systems, or methods embodiments it should be understood that such example embodiments can be implemented in various devices, systems, and methods.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 5 shows an example of a pair of geolocation API requests that use a range-free mode and a range-based mode, according to some aspects of the disclosure.

DETAILED DESCRIPTION

The detailed description set forth below in connection with the appended drawings is intended as a description of various configurations, organizations of components/steps, specific calculations/equations, and other examples and is not intended to represent the only ways in which the subject matter described herein may be practiced. The detailed description includes specific details to provide a thorough understanding of various embodiments of the present disclosure. However, it will be apparent to those skilled in the art that the various features, concepts, and embodiments described herein may be implemented and practiced without these specific details, or in alternative formats. In some instances, well-known structures and components are shown in block diagram form to avoid obscuring such concepts. Likewise, while certain advantages of the systems and methods described herein are highlighted, it should be recognized that additional advantages may flow from use of these systems and methods even though not stated herein.

Example Hardware Systems

Figure 1:
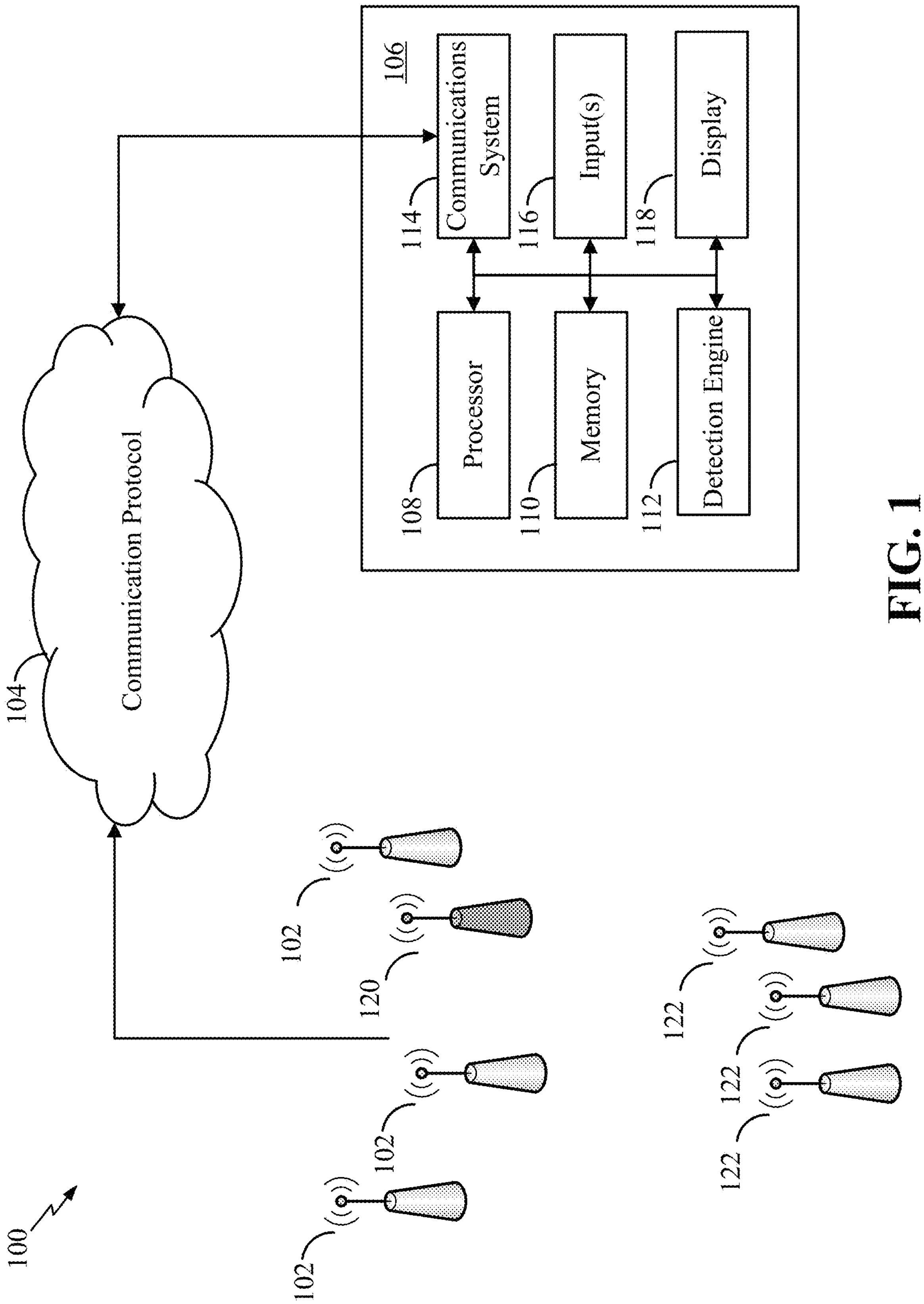
FIG. 1 is a block diagram conceptually illustrating a system for detecting Wi-Fi spoofing attacks, according to some aspects of the disclosure.

FIG. 1 shows a block diagram illustrating an example of a system 100 for detecting Wi-Fi spoofing attacks. In some examples, a computing device 106, such as a user's computer or mobile device, an IoT device, etc. may incorporate some or all of the features of the present disclosure. Generally, the computing device 106 detects Wi-Fi signals being broadcast by one or more access points (APs) 102, 120 from a relatively nearby location. In other words, the computing device 106 may comprise a communications system 114 that may comprise a transceiver that detects radio-frequency signals within a given band, such as a Wi-Fi network card. Typically, signals from APs have a relatively limited distance at which their signals can be detected sufficiently to allow for information extraction, given device constraints, regulatory constraints, or standards. In other embodiments, the computing device may be connected to such a communications system 114 that is located remotely from the device 106 itself.

The computing device 106 can include a processor 108. In some embodiments, the processor 108 can be any suitable hardware processor or combination of processors, such as a central processing unit (CPU), a graphics processing unit (GPU), an application specific integrated circuit (ASIC), a field-programmable gate array (FPGA), a digital signal processor (DSP), a microcontroller (MCU), cloud resource, etc.

The computing device 106 can further include, or be connected to, a memory 110. The memory 110 can include or comprise any suitable storage device(s) that can be used to store suitable data and instructions that can be used, for example, by the processor 108. The memory may be a memory that is "onboard" the same device that detects the spoofing attacks, or may be a memory of a separate device connected to the computing device 106. Software that may be used for analyzing AP data to evaluate if a Wi-Fi spoofing attack is occurring may operate as an independent application or module, such as a separate detection engine 112 that runs on the same processor 108 or a specialty processor (such as a GPU) that achieves greater efficiency in processing the API data through mathematical operations, as described below. In other examples, the software may be incorporated into processes that manage communications system 114 for processing signals and Institute of Electrical and Electronics Engineers (IEEE) Wi-Fi protocols. Thus, processor 108 and memory 110 may resources dedicated to a Wi-Fi network card or similar communications system, or may be a more generalized processor/memory that performs multiple tasks for device 106. The memory 110 can include any suitable volatile memory, non-volatile memory, storage, or any suitable combination thereof. For example, memory 110 can include random access memory (RAM), read-only memory (ROM), electronically erasable programmable read-only memory (EEPROM), one or more flash drives, one or more hard disks, one or more solid state drives, one or more optical drives, etc.

In further examples, computing device 106 can receive or transmit information wirelessly via a given communication protocol or network 104. In some examples, the communication network 104 can be any suitable communication network or combination of communication networks. For example, the communication network 104 can include one or more of a variety of wireless communication standards such as an IEEE-defined 802.11 Wi-Fi network, a peer-to-peer network (e.g., via a Bluetooth or Near Field Communication (NFC) protocol), a cellular network (e.g., a third-generation (3G) network, a fourth-generation (4G) network, a fifth-generation (5G) network, etc., complying with any suitable standard, such as Code Division Multiple Access (CDMA), Global System for Mobile Communications (GSM), Long Term Evolution (LTE), LTE Advanced, New Radio (NR), 5G, etc.), or other Wi-Fi or Bluetooth type alternatives.

In some examples, the protocol or protocols of the communication network 104 allow for standardization for how transmitting and receiving devices exchange identifying information. Typically, such as in the case of 802.11 Wi-Fi protocols, certain information relating to a broadcasting AP 102 can be gleaned from the signals it transmits. For example, a nearby AP 102 might broadcast certain identifying information such as location information, authentication credentials, protocols, network ID, security settings, etc.

In further examples, computing device 106 can further include a display 118 and/or one or more inputs 116. In one embodiment, the display 118 can include any suitable display devices, such as a computer monitor, a touchscreen, a television, an infotainment screen, etc. to display the report. In further embodiments, and/or the input(s) 116 can include any suitable input devices (e.g., a keyboard, a mouse, a touchscreen, a microphone, etc.). In yet further embodiments, the AP 102 may be a wireless access point (WAP), an ethernet switch, a router, a cell tower, etc.

As shown in FIG. 1, there are a number of nearby legitimate APs 102 broadcasting signals that are within detection range of device 106. There may also be one or more APs controlled by an attacker that are broadcasting falsified signals, such as Wi-Fi signals that are spoofed. However, without further analysis of the received broadcasts, the device 106 may not be able to immediately discern whether any given nearby AP 102, 120 is legitimate or not. As described further below, spoofed Wi-Fi broadcasts could be used in a variety of ways to impact users of devices 106 that might be relying on local Wi-Fi information for various tasks.

Therefore, as further described below, the device 106 may operate or otherwise benefit from certain processes, methods, and techniques (such as may be embodied in a software-based Detection Engine 112) to identify falsified APs. In some embodiments, these techniques may involve reliance upon a set of trusted "reference" APs 122 which are located at a location different from the nearby APs 102, 120 and/or the device 106 itself. In some embodiments, these reference APs may be located further from the device 106 than their broadcast range, such that device 106 does not detect their signals; in other embodiments they may be within broadcast/detection range but located in a different location than APs 102, 120. Thus, while the APs 122 may operate according to the same protocol (e.g., the same 802.11 protocol) as the communications system 114 of device 106, they may not be within actual wireless signal range of each other so as to actually communicate with one another via the communication protocol 104.

Example Methods and Techniques

Figure 2:
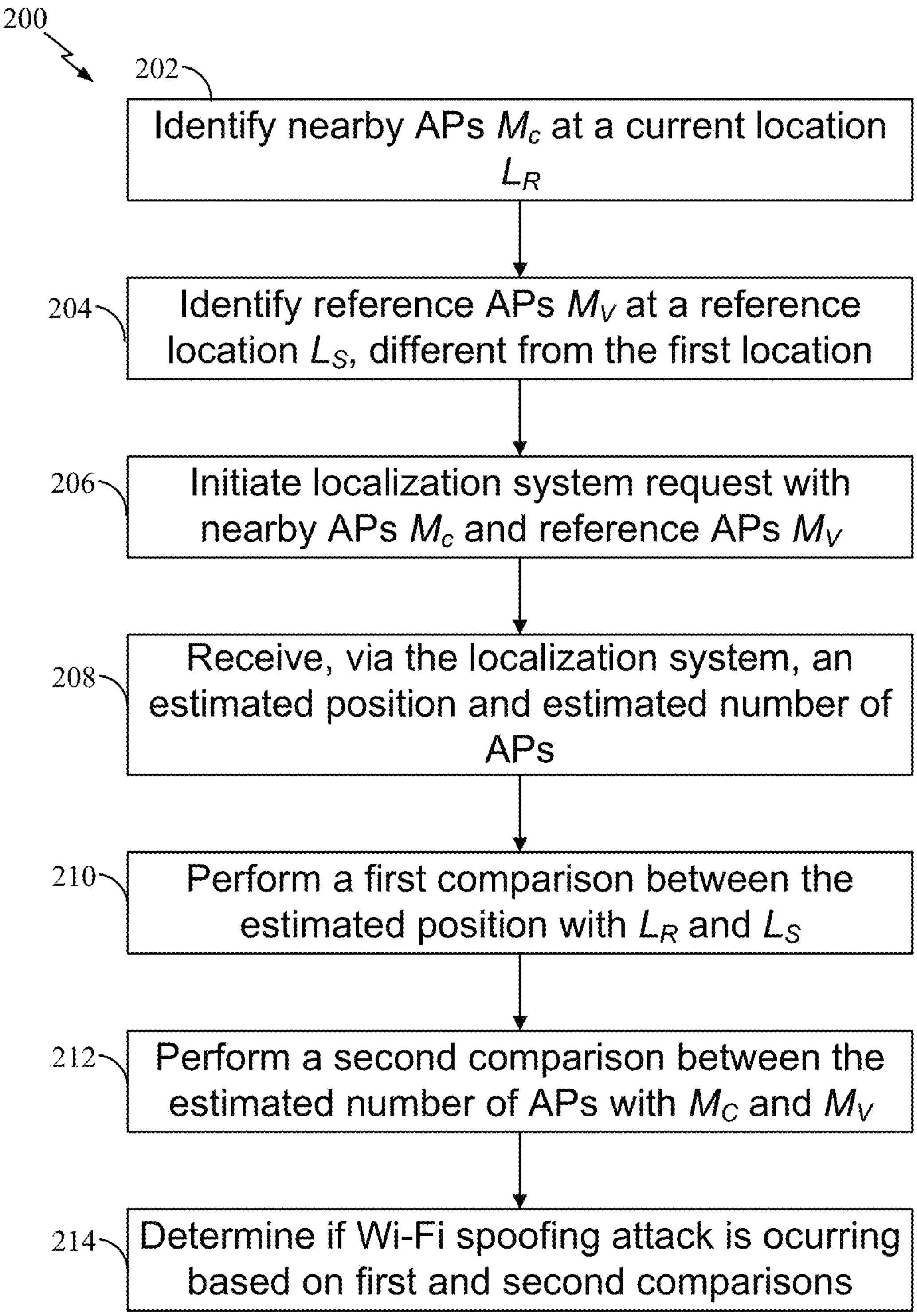
FIG. 2 is a flow diagram illustrating an example process for identifying whether a Wi-Fi spoofing attack has occurred, according to some aspects of the disclosure.

FIG. 2 is a flow diagram illustrating an example process 200 for determining if a Wi-Fi spoofing attack has occurred, in accordance with some aspects of the present disclosure. As described below, a particular implementation can omit some or all illustrated features/steps, may be implemented in some embodiments in a different order, and may not require some illustrated features to implement all embodiments. In some examples, an apparatus (e.g., device 106, processor 108 with memory 110, etc.) in connection with FIG. 1 can be used to perform all or part of example process 200. However, it should be appreciated that other suitable processing hardware for carrying out the operations or features described below may perform process 200.

At block 202, the process 200 may begin by identifying nearby APs, denoted as Mc, at a current location $L_R$. In some embodiments, this may involve detecting all APs (according to their broadcasted signals) that are within reception range of the device at the current location, using any available Wi-Fi scanning techniques, such as passive or active scanning. In other embodiments, this may involve detecting all APs but selecting only those APs with a signal strength indicative of a presence within a specified reference, or selecting only the APs having the top 5, 10, 15, 20, etc. strongest signals.

In some embodiments, identifying nearby APs Mc at the current location LR may be performed using a Wi-Fi module embedded in a user's device. This module can be any IEEE 802.11-compatible Wi-Fi chipset capable of scanning available APs in the vicinity. Software running on the user device may include a Wi-Fi scanning application that interfaces with the operating system (OS) to execute active or passive scans. The scanning results, including AP Media Access Control (MAC) addresses, signal strengths, and other relevant details, may be processed by the device's application layer. In other embodiments (such as where resource constraints may be present, or shared/distributed detection services are used), the scanning results may be sent to a remote device for processing and detection.

At block 204, reference APs, denoted as MV, may be identified at a reference location LS, which is different from the current location $L_R$. In some embodiments, this involves identifying known APs located at a separate geographic location, which may be stored in a database or determined through other geolocation services.

In some embodiments, identifying reference APs MV at a reference location LS may involve accessing a pre-existing database of known and/or trusted APs, stored either locally on the user's device or accessed remotely via a local or Internet-enabled resource. Software managing this function could include location services applications or APIs, such as Google Geolocation API, capable of querying for reference locations based on the AP data. In further embodiments, the reference APs may be determined from a remote or third party detection service, and/or through shared/distributed detection schemes. For example, if a second user in a different location determines (via the processes described herein such as in FIG. 4) a set of accurate, legitimate, and/or trusted APs in the vicinity of the second user, those APs may be deemed available to use as reference APs within the shared/distributed system, either permanently or for a designated period of time (e.g., 5 minutes, an hour, a day, two days, five days, etc.).

At block 206, the process 200 may initiate a localization system request with both the nearby APs Mc and the reference APs MV. This request may be sent to a Wi-Fi geolocation service or a similar system capable of processing AP location data. As described in the Examples section below, various available localization services can be queried via an API to initiate this request, such as Google's localization service.

In some embodiments, initiating the localization system request with both nearby and reference APs (Mc and MV) may involve the use of a software application that confirms which nearby APs and reference APs should be submitted in a request, and ensuring that the request includes a number of nearby APs that is one more than the number of reference APs. The request may be sent by a user device's networking hardware, such as a mobile device's Wi-Fi transceiver, wired network connection, cellular connection, or other communication connection, to communicate with an external geolocation service. Software responsible for this step could include a mobile application or a background service that formats a request according to the protocol of an applicable API or other suitable format and sends it to a geolocation server via an Internet connection.

In alternative embodiments, other strategies may be used for formulating a grouped localization request to coordinate with different localization approaches available from localization services. For example, where the precise locations of a dispersed group of reference APs Mc is known in a given pattern, and a set of nearby APs (e.g., 2, 3, 4, 5, 10, 15, 20, etc. nearby APs) is added to the precise reference group, a localization service may be utilized that returns a location result that is the geographic average location of the grouped APs. For example, if the reference APs are dispersed in a square, circle, triangle, or any other pattern relative to the user, a "center" of the pattern can be assumed. Then, when the number of nearby APs are added to the group, the average location of the APs should shift from the center by a predetermined amount if all nearby APs are actually legitimate. However, if the average location drifts in an unexpected direction or by an unexpected degree, it could be assumed at least one or more nearby APs are broadcasting falsified signals.

In a similar fashion, where a localization system outputs a location based on other determinations (e.g., an average location, a median, a "zone" rather than a precise location, a histogram of distances/locations, etc.) the grouping of reference APs and nearby APs can be adjusted to ensure that the presence of a falsified signal will cause an "unexpected" return from the localization system that is indicative of the presence, location, and/or amount of falsified AP signals.

At block 208, the localization system may return an estimated position and an estimated number of APs to the user device. The response may include the geographic location of the grouped APs, according to the localization system's location determination scheme. As described in the Examples section below, the Google localization service may return location information based on the largest cluster of AP locations. Software processes, such as those running on the device's operating system (OS) or application layer, may also interpret the localization service's response and extract relevant data (e.g., position coordinates, AP counts) for further analysis.

At block 210, the process 200 performs a first comparison between the estimated position obtained from the localization service versus the locations $L_R$ and LS. Where the number of nearby APs exceeded the number of reference APs by one, then whenever the estimated position corresponds to the location LS of the reference APs, it can be assumed that at least one of the nearby APs was not determined to be located in the vicinity of the user at location Lr, and so the process 200 can intuit that a spoofed Wi-Fi attack has occurred (i.e., that a Wi-Fi signal being broadcast nearby the user is not actually at the location it is suggesting by its broadcast information). In other words, the comparison helps to determine whether the estimated position matches the current or reference locations, indicating possible spoofing.

In a similar manner, "unexpected" estimated positions returned by the localization service can also indicate that at least one nearby AP was falsified, or may indicate even the location(s) and/or number of falsified APs depending on the distribution of reference APs.

In some embodiments, performing the first comparison between the estimated position and LR and LS may be executed by software running on the user device's processor.

At block 212, a second comparison may be performed between the estimated number of APs and the actual number of APs, Mc and MV. This may be utilized to help ensure that the number of detected "nearby" APs aligns with the expectations based on the current and reference locations. Data from previous scans or queries are compared using simple logical functions to identify discrepancies in the number of detected APs. AXd, in distributed detection schemes, different trusted users may detect different numbers of nearby APs in an overlapping or interleaved fashion that can indicate falsified WiFi broadcasts.

At block 214, the process 200 may determine whether a Wi-Fi spoofing attack is occurring based on the results of the first and/or second comparisons. If discrepancies are found in either the geographic location or the number of APs, the process identifies potential spoofing and can generate an alert to the user and/or to other trusted devices in a shared or distributed detection scheme, stop any connection or communication with the falsified Wi-Fi signal, record incoming and outgoing packet information that was transmitted between the user device and the falsified signal, and/or take other mitigation steps. In some embodiments, determining whether Wi-Fi spoofing is occurring may be done by a detection engine or software module that aggregates the results of several comparisons and applies predetermined thresholds or rules. The system may flag an alert or take preventive action if significant mismatches are found, using a notification system or security application.

Figure 3:
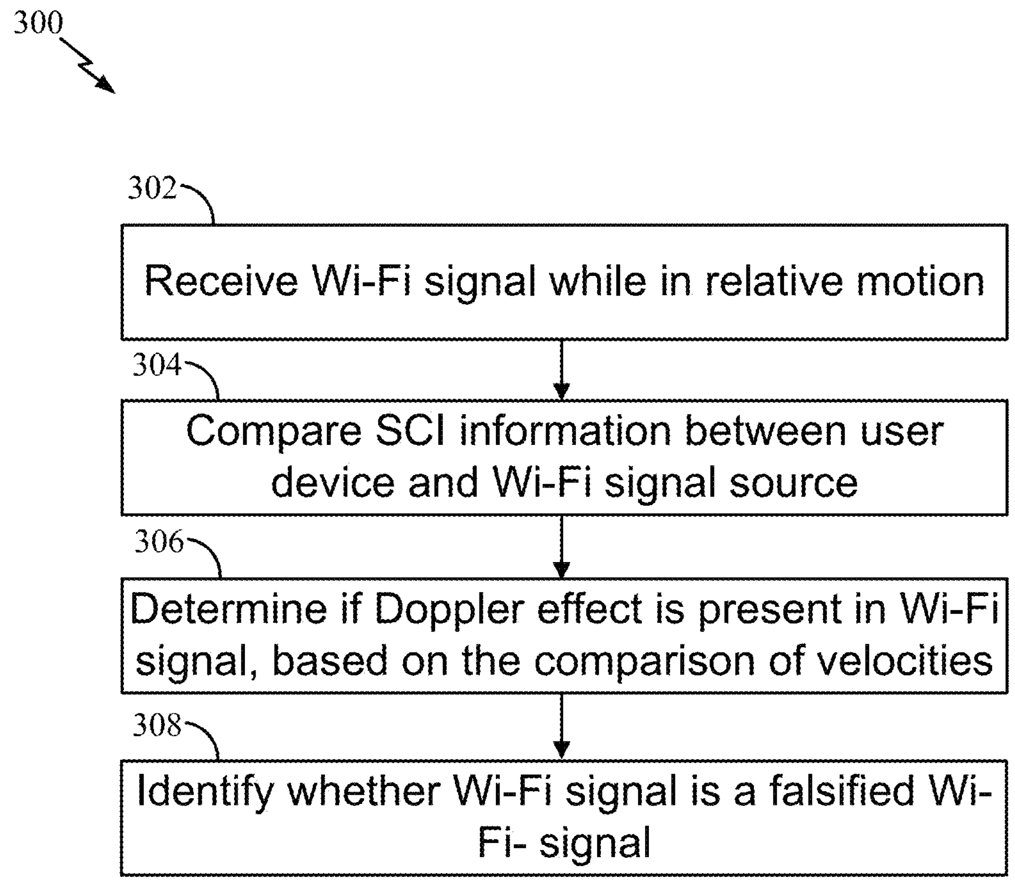
FIG. 3 is a flow diagram illustrating an example process for identifying a falsified Wi-Fi signal, according to some aspects of the disclosure.

FIG. 3 is a flow diagram illustrating an example process 300 for utilizing Doppler effect to identify a falsified Wi-Fi signal, according to some aspects of the disclosure. As described below, a particular implementation can omit some or all illustrated features/steps, may be implemented in some embodiments in a different order, and may not require some illustrated features to implement all embodiments. In some examples, an apparatus (e.g., device 106, processor 108 with memory 110, etc.) in connection with FIG. 1 can be used to perform all or part of example process 300. However, it should be appreciated that other suitable processing hardware for carrying out the operations or features described below may perform process 300.

At step 302, the process 300 receives a Wi-Fi signal. In some examples, a user may receive the Wi-Fi signal while attempting to receive car navigation instructions (i.e., directions). In some embodiments, process 300 may be receiving Wi-Fi signals while the user device is in relative motion—in other words, in circumstances in which it is expected that the user device and nearby APs should be experiencing changing distances (whether the user is moving, or the APs should be expected to be moving). The relative motion of the device could be due to one or more vehicles, pedestrians, IoT devices, or any other scenario where the device perceives motion relative to the surrounding APs.

At step 304, the process 300 may compare Signal Characteristic Information (SCI), such as signal strength or frequency, between the user device and the nearby Wi-Fi signal source(s). This comparison can aid in identifying any anomalies that could indicate spoofing.

In some embodiments, the process 300 determines the velocity of the user device that received the Wi-Fi signal relative to the Wi-Fi signal's source. Where it is expected that the user device's velocity should result in corresponding, known changes in SCI of the nearby AP if the Wi-Fi signal source is stationary, process 300 should detect expected changes in SCI information relative to the AP.

In some examples, the process 300 may compare other physical-layer characteristics of the Wi-Fi signals and compare them to those same characteristics of the user's device. For example, as mentioned above, the user may be utilizing the Wi-Fi signal to receive directions, therefore, the user's device has a velocity corresponding to the speed of the vehicle. In other examples, the user may be walking, running, or moving via other means of transportation, causing their device to have a non-zero velocity recorded by on-device sensors such as accelerometers, gyroscopic sensors, etc. In some examples, comparing Signal Characteristic Information (SCI) between the user device and the Wi-Fi signal source may be performed using specialized signal processing software running on the user device. This software may analyze signal strength, frequency, and other parameters that can be derived from SCI of nearby APs, leveraging the device's processor. The comparison could also involve calculating differences between observed values and expected values based on the device's motion (e.g., speed and direction).

At step 306, the process 300 may determine if a Doppler effect is present in the Wi-Fi signal, based on the comparison of the information obtained in step 304. In some examples, the presence of an expected Doppler effect in the Wi-Fi signal may indicate it has been transmitted via a legitimate AP, because the APs are stationary, while the user's device is moving. Similarly, if the Wi-Fi signal is expected to have its own velocity, or a specific relative velocity between the AP and user device is expected, and different in calculated Doppler effect can be detected and recorded.

Determining the presence of a Doppler effect may be performed by signal analysis algorithms implemented in software. The Doppler effect, which results in frequency shifts based on relative motion, could be detected using a variety of signal processing techniques such as Fast Fourier Transform (FFT) algorithms or similar frequency analysis techniques that may be employed to process Wi-Fi signals' attributes. This software could interface with the device's Wi-Fi hardware to continuously monitor and analyze signal frequencies in real-time.

At step 308, the process 300 identifies whether a given Wi-Fi signal is a falsified Wi-Fi signal. In some examples, if no Doppler effect is present or an unexpected Doppler effect is present in the Wi-Fi signal, the process 300 may flag the Wi-Fi signal as being falsified. For example, an attacker sending out the Wi-Fi signal may also be moving relative to the user's device. That is, the Doppler effect would be minimal or zero.

Figure 4:
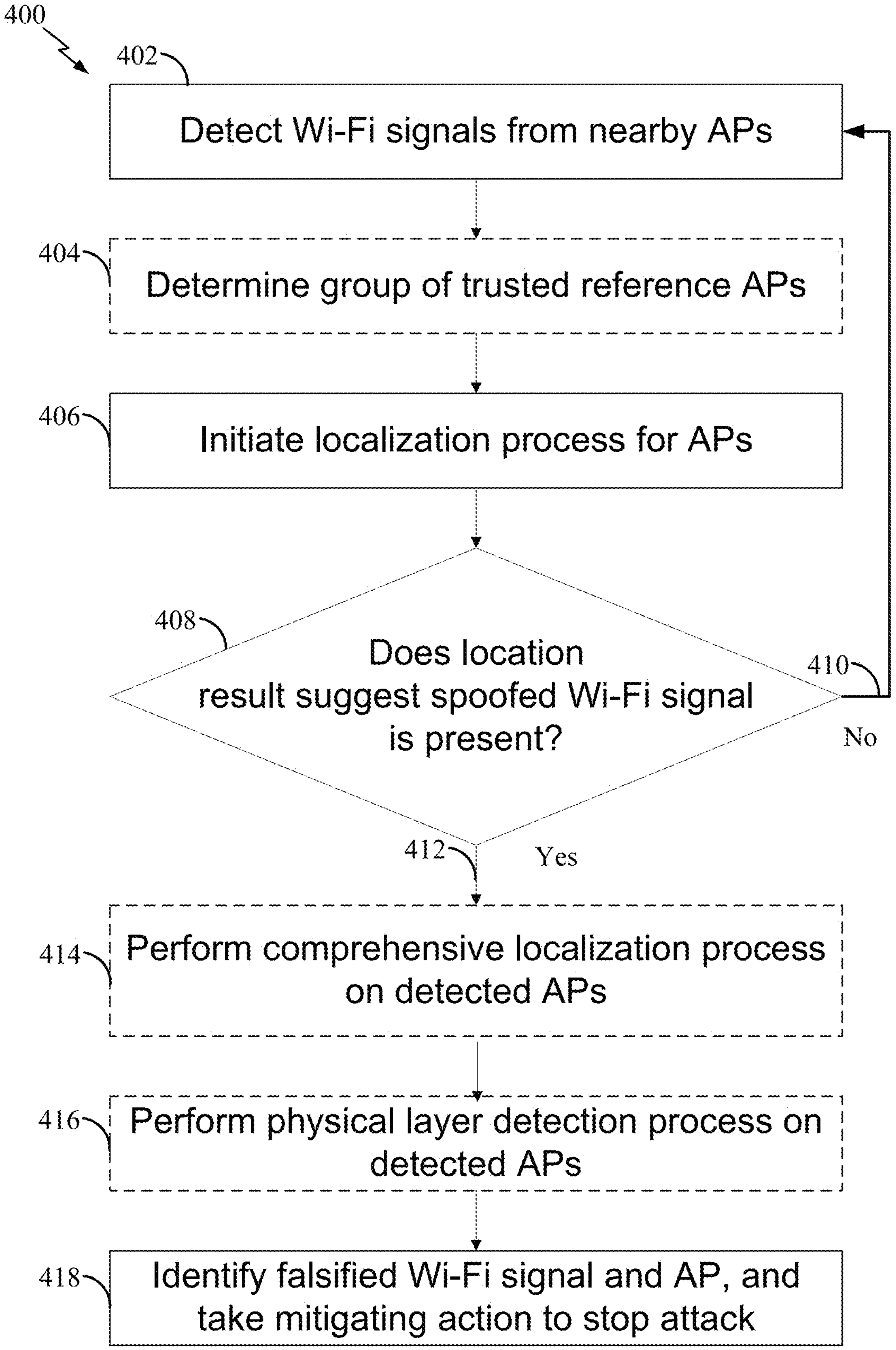
FIG. 4 is a flow diagram illustrating an example process for employing multiple detection methods in a resource-efficient manner, to determine if a Wi-Fi spoofing attack has occurred, according to some aspects of the disclosure.
Figure 6:
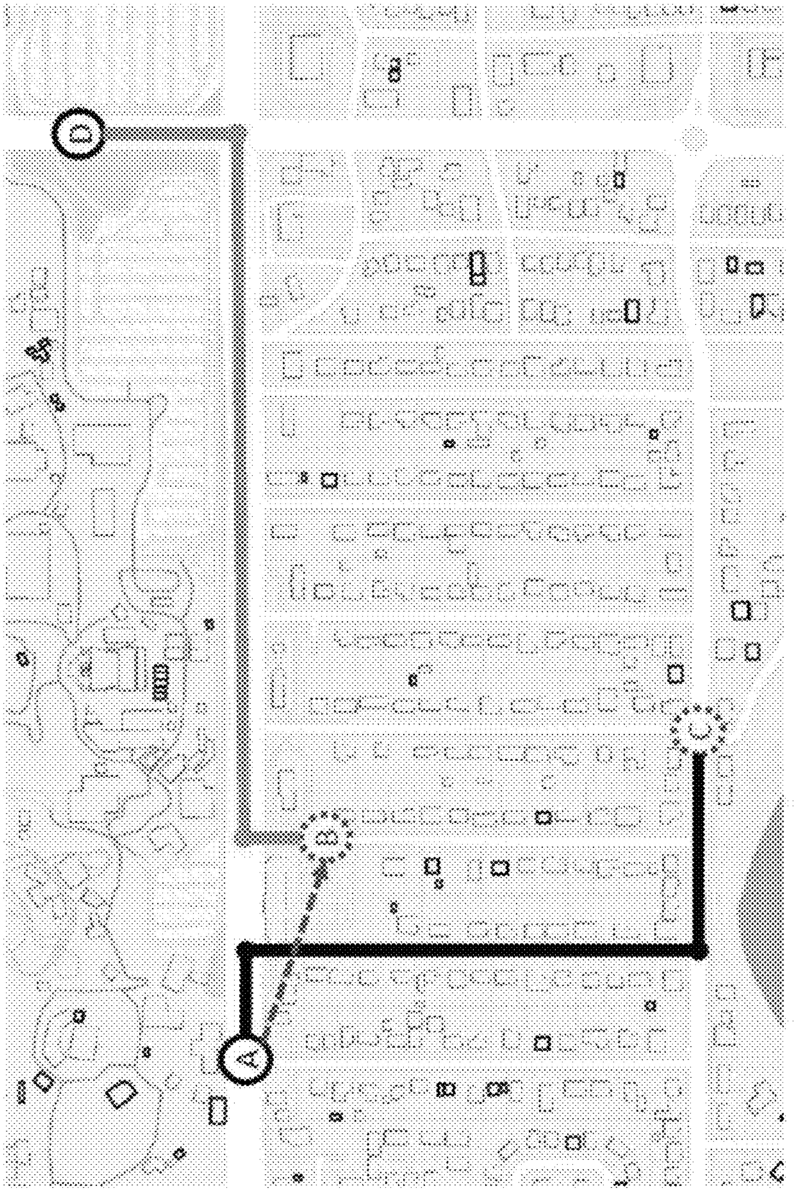
FIG. 6 shows an example map of a victim attacked by a spoofer.
Figure 7A:
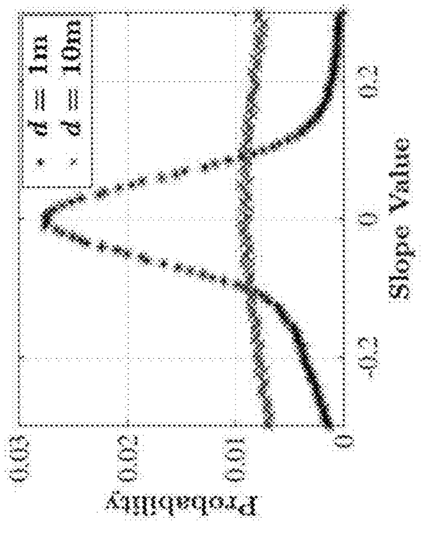
FIG. 7A is a first panel of a graph illustrating information concerning sub-carriers and the distribution of 4*d*, according to some aspects of the disclosure.
Figure 7B:
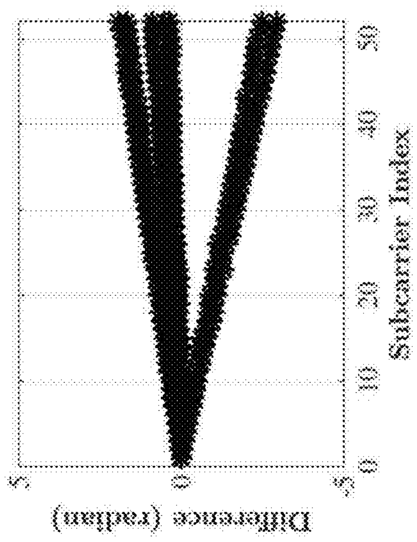
FIG. 7B is a second panel of a graph illustrating information concerning sub-carriers and the distribution of 42*a*, according to some aspects of the disclosure.
Figure 7C:
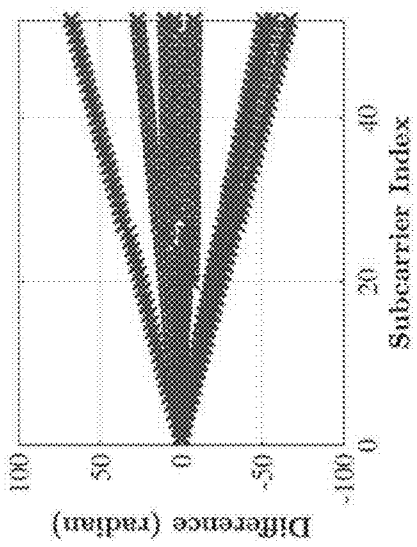
FIG. 7C is a third panel of a graph illustrating information concerning sub-carriers and the distribution of 41*a*, according to some aspects of the disclosure.

Referring now to FIG. 4, a process 400 is depicted in the form of a flowchart which provides an illustrative example of a scheme for detecting Wi-Fi spoofing utilizing two or more of the techniques described herein.

At block 402, the process 400 may actively or passively detect and monitor Wi-Fi signals from nearby APs. As described above with respect to FIG. 2, the selection of which APs to monitor can vary. In some embodiments, the user device scans the surrounding area to identify APs within range.

Detecting Wi-Fi signals from nearby APs may utilize a Wi-Fi scanning module, which may be integrated into a user device's network interface controller (NIC). This hardware scans for available APs and collects signal data. In some circumstances, this hardware may already be present on a user device, and can be accessed by a novel software application. For example, software implementing this process 400 may include the device's OS-level networking services, or third-party applications specifically installed for performing Wi-Fi monitoring via process 400.

At block 404, the process 400 may optionally determine a group of reference APs, as described above with respect to FIG. 2. In some embodiments, the reference APs may be a standard set of APs that is stored locally to the user device, may be dynamically determined based on the user device location and the number/strength of nearby APs, or may be provided by a third party resource.

At block 406, a localization process may be initiated for the detected APs. This may involve sending queries to a geolocation service, such as the Google Geolocation API, to determine the location(s) of the detected APs and/or reference APs. In some embodiments, this may include a pairwise submission of requests for nearby APs (as described below in the Examples section) or a grouped localization request using reference APs as well as nearby APs. In yet further embodiments, APs having stronger signal strength may be submitted in one group and APs having lesser signal strength may be submitted in another group.

At block 408, process 400 may determine whether the location results suggest that a spoofed Wi-Fi signal is present. If the location and physical characteristics do correlate with expectations 410, the process returns back to a monitoring state and begins again at block 402. The process may repeat step 402 right away, or may wait until there is a change in nearby detected signals (e.g., a new AP is detected, or there is a change in other AP information detected by the user device), or may delay a preset period of time and then resume.

However, if the process obtains location information that does not match expectation or any other discrepancies are found 412, which could be indicative of spoofing, the process 400 may then undertake one or more methods for more specifically identifying the falsified Wi-Fi signal and the corresponding AP.

At block 414, process 400 may optionally perform a comprehensive process for comparing all detected APs via a series of localization requests. Such a scheme is described below in the Examples section, wherein APs are grouped by a specific method and submitted to a localization service until a location mismatch is found.

At block 416, process 400 may optionally perform a physical layer detection process for identifying a specific falsified AP. For example, process 400 may perform the method of FIG. 3, or may otherwise compare location information for a given AP with signal information derived from SCI to detect whether the AP is broadcasting a spoofed signal.

In some embodiments, performing physical layer detection processes on detected APs may hardware capable of deep packet inspection or signal analysis, such as a specialized Wi-Fi network card. Process 400 may also utilize software solutions at block 416 to aid in physical layer detection, which may include physical layer analysis tools, which could evaluate signal characteristics such as timing, modulation, and signal-to-noise ratio (SNR) to detect spoofing attempts. This may involve leveraging the OS's networking stack or third-party security software designed to analyze physical layer attributes.

At block 418, once process 400 has identified the one or more APs that were falsified, process 400 may take appropriate mitigating actions to stop the attack, such as alerting the user or blocking the connection to the falsified AP, or other actions as described herein.

Example Implementations and Experimental Findings

An attacker can subvert a Wi-Fi localization system without the need to jam Wi-Fi signals from legitimate APs. Given their comprehensive investigation of attackers' capabilities in spoofing locations to influence Wi-Fi localization systems, the inventors have determined that using a system or method that can leverage multiple techniques, using different resources, for detecting such activity is desirable. For example, the detection of jamming signals in identifying the presence of an attacker cannot be solely relied on. Thus, described herein are innovative methods that goes beyond jamming detection to effectively detect and mitigate these attacks.

Initially, it was found that a victim could use a geolocation service or application programming interface (API) to identify the location of a given AP. The locations of APs are usually stored in a location database that is hosted by a Wi-Fi localization system. Existing Wi-Fi localization systems (e.g., those adopted by Google Maps, Mozilla services, and others) usually provide geolocation APIs that enable a mobile device to obtain its own location estimate by submitting nearby detected Wi-Fi information to a Wi-Fi localization system. Upon the request from the geolocation API, the location service provider searches the location database, which contains the locations of Wi-Fi APs in the connected world. The inventors found that a user may utilize the geolocation API to obtain the location data of even a single AP residing in the location database. Specifically, if the user detects multiple APs from a geographic location at which the user is currently positioned, the user can only know that these APs are close to the user's current location, as the results of a request to a localization service based on all of these APIs would ordinarily not give the user any idea about the precise locations recorded in the location database for these APs. However, as mentioned earlier, a request to a geolocation API as to a single AP, a pair of APs, or other small number could potentially be used by a potential to extract location data from the location database concerning a given AP.

By leveraging how geolocation services calculate location results, a victim can formulate location requests in a way that can reveal which APs in nearby range are false. There are several characteristics of geolocation services that can be leveraged in this manner.

Some geolocation services rely on averaging the locations of submitted APs, while some weight or select just some APs. For example, some localization services would directly return the geographic location of one out of two APs by making an API request with pairwise APs using a 'range-based' mode in which signal strength is taken into account. For example, by making an API request with APA and APB using signal strength as shown in FIG. 1, the Geolocation API returns the location data of APA in the location database. The inventors observed that the Geolocation API returns a position estimate that is equal to the geographic location of the AP with a greater received signal strength (RSS) value when a user makes an API request with pairwise APs. If the same API request is made while switching the signalStrength values by using −55 and −45 for APA and APB, respectively, it returns the location of APB. The inventors also observed similar results from other location service providers such as the Mozilla location service.

However, for some services that do not utilize signal strength (e.g., a 'range-free' mode), the results of the localization service may represent an average location, or provide a confidence zone. Thus, when using pair-wise APs that are expected to be nearby one another, a victim may expect the average location to be very near. However, when an unexpected location is returned, the victim may then intuit that one of the two APs is falsified.

Thus, the victim may use the Geolocation API to detect designated APs that are falsified by the attacker. For example, for the Google Wi-Fi localization system, suppose the victim observes multiple APs from her current location. The victim can employ the aforementioned location inference method to uncover the locations stored in the location database of the targeted Wi-Fi localization system corresponding to these APs. Imagine that among these APs, some of them are designated while others are legitimate. The victim's objective is to identify whether there are any designated APs among the observed APs. The basic strategy is that the victim first takes one AP as a reference AP, which is far away from the current location. For each AP among visible APs at the current location, the victim can obtain its location data by making an API request with the reference AP while assigning it with a greater signalStrength value. Note that one can obtain the location of one AP using the location inference method even though the distance between two APs is over thousands of miles. Therefore, the victim can determine if the attack does exist leveraging the distributions of visible APs. For example, if the victim is located at Hamilton Park in New Jersey, but some APs among all visible APs are close to the Empire State Building in Manhattan, the victim can recognize these APs and conclude that these APs are designated APs. The reference AP can be an AP from other states, such as California.

However, this method can result in a substantial number of API requests. For instance, if the victim observes 120 nearby APs, the user might request 120 API requests to ensure the identification of these APs. This basic method also raises privacy and ethical concerns as it discloses the location data of APs, and so may not always remain a viable option. The inventors also discovered that Google Maps Platform products, such as the Geolocation API, are safeguarded against unauthorized use by requiring valid authentication credentials in the form of an API key. Each API key is a unique alphanumeric string associated with a Google billing account. To enable the Geolocation API, the user must apply a valid API key from one of their Google billing accounts and associate it with the Geolocation API. Google Maps Platform each month provides free credits of $200, which is equivalent to 40,000 free requests each month. Google Maps Platform does not impose a specific restriction on the maximum number of Geolocation API requests per day and each API key can send up to 100 Geolocation API requests per second. As such, for the above example, it may take around 1 second for the detection of the attacker. This implies that it may be feasible but not efficient to make this detection strategy compatible with Google's API restriction rules. Nonetheless, it is important to note that different Wi-Fi localization systems may adopt different rules and restrictions.

To address this limitation and enhance the compatibility and privacy of the approach, the inventors developed more advanced detection techniques as well. One such technique may involve randomly grouping observed APs into multiple sets, each of which might contain three APs (or some other relatively small number that is greater than 2, such as 4, 5, 6, 7, 8, 10, 12, etc.). For each set, the user could query a localization service with all of the APs in the set, or a subset of the APs. For a first random set of 3 APs (referred to, for discussion purposes, as x, y, and z), the technique might pair two of them (x and y) and submit a pair-wise request, then another pair-wise request with a different pair of two (x and z) from the same set of 3 APs. If the first pair-wise request returns an unexpected location, but the second request does not, then it can be inferred that the falsified AP is y. If both of the first two requests returned an expected location, then the remaining pairing could be sent in a geolocation request to confirm none of the three are falsified. Similarly, the technique of random grouping can also be used to strategically order and rank how localization requests are sent to an API (such as where a localization service throttles requests, limits requests, or the device is resource constrained). For example, if a localization service provides a confidence zone or average as the result, and groups of 2 or 3 APs seem to have a tight confidence zone or average location very near to expectation, then these groups may not need to be individually or pair-wise assessed. However, if a group returns an abnormally large confidence zone or unexpected average, then the victim device may iteratively narrow the number of APs in subsequent requests until the falsified AP can be determined.

Additionally, the inventors predicted that the victim always detects mixed Wi-Fi information from two distinct locations when an attacker falsifies designated APs without jamming legitimate APs. To detect the presence of an attack, instead of making an API request with visible APs solely, the victim can make an API request with nearby APs that are detected at its current location, and a set of reference APs, which are from a reference location that can be any locations as long as it is far away from the current location. Let $M_C$ and $M_V$ indicate the numbers of the detected APs and the reference APs in an API request, respectively, where $M_C=M_V+1$. AXd $M_C=M_R+M_S$, where $M_R$ and $M_S$ are the numbers of legitimate and designated APs from the current location $L_R$ and the designated location $L_S$, respectively. The position estimate of $M_V$ is at location $L_V$. Note that $M_V$ and $L_V$ of the reference APs should be kept confidential.

Recall that the attacker can do Wi-Fi spoofing without jamming by using more designated APs than the legitimate ones in urban areas. This is because when a Wi-Fi localization system receives mixed Wi-Fi information from different locations in one API request, it returns a position estimate that is the location surrounded by the greatest number of APs. By making an API request with $M_C$ and $M_V$, a Wi-Fi localization system returns the position estimate at the current location $L_R$ if there is no attack. This is because $M_C=M_R$ as $M_S=0$, then $M_R>M_V$ in the API request as $M_R=M_V+1$. On the other hand, the Wi-Fi localization system returns the position estimate at location Ly if there is an attack and $M_S \in [2, M_C-2]$. To explain it, first, $M_S \in [2, M_C-2]$ means $M_R \in [2, M_C-2]$ because $M_C=M_R+M_S$. Given $M_C=M_V+1$, one can derive:

$$\begin{cases} M_s = M_v + 1 - M_R \leq M_V,\ M_R \geq 2, \\ M_R = M_V + 1 - M_S \leq M_V,\ M_S \geq 2. \end{cases}$$

Therefore, the Wi-Fi localization system returns the position estimate at location LV as MV has the greatest number of APs. To further demonstrate this method, an example is considered in which the mobile device detects $M_C=21$ APs at location $L_R$, and set $M_V=20$ APs accordingly. If there is no attack, $M_S=0$ and $M_R=21$ APs. Because $M_R>M_V$, an API request with $M_C$ and $M_V$ returns the current location $L_R$. On the contrary, assume that an attack is present and the attacker broadcasts $M_S=15$ falsified APs. Although the attacker successfully spoofs the mobile device to the spoofing location LS as $M_R=6$ and $M_S>M_R$, an API request with $M_C$ and $M_V$ returns the position estimate at location $L_V$ because $M_V>M_S>M_R$. Thus, an alarm that indicates the existence of the location spoofing attack can be raised to the device because the above position estimate indicates that $M_C$ consists of mixed Wi-Fi information from different locations. Note that this advanced method can detect attacks when the designated location $L_S$ is over 200 meters away from the real location $L_R$. This restriction comes from the localization algorithms in these Wi-Fi localization systems. It was found that when existing Wi-Fi localization systems (e.g., Google and Mozilla) receive mixed Wi-Fi information from different locations in one API request, they first cluster APs with a radius of 200 meters and then determine the position estimate based on a cluster with the maximum number of APs. Therefore, APs $M_S$ from the designated location will be taken as $M_R$ if the distance between $L_S$ and $L_R$ is less than 200 meters, and then this advanced detection tool returns $L_R$ as $M_R>M_V$ and $M_S=0$.

The advanced method is more efficient than the basic one in terms of determining the presence of Wi-Fi spoofing attacks when the legitimate and designated APs are mixed. Moreover, compared to the basic method, this method sends ONE instead of multiple API requests, leading to fewer financial costs to the users. It also mitigates the ethical issues as it does not disclose the location data of APs. However, this method could be vulnerable to the Denial-of-Service attack. As one non-limiting example, an attacker may seek to force the victim to disable this countermeasure. Toward this goal, the attacker can use a small number of designated APs (e.g., $M_S=2$). Although the victim obtains the correct location from the Wi-Fi localization system as $M_R>M_S$, the advanced method still triggers alarms because $M_V>M_R$. This may discourage the victim from using the countermeasure as it generates too many false alarms. In addition, the reference APs $M_V$ are subject to change in terms of the number of detected APs $M_C$, because this method must conform $M_C=M_V+1$ for detection purposes. To address the issue of false alarms triggered by the attacker, the advanced method is further refined to reduce such occurrences. One potential solution is to initialize a set of reference APs $M_V$ in advance. Assume the mobile device detects Mc visible APs at the current location, instead of making one API request with Me and $M_V$, randomly splitting Mc APs into n sets of APs, where $$n = \left[ \frac{M_C}{(M_V + 1)} \right]$$

and each set contains ($M_V$+1) APs. Let Mic denote $i^{th}$ set detected APs, where i=1, 2, . . . , n. For $i^{th}$ set, an API request is made with Mic and $M_V$ and obtain the position estimate Li. To detect the presence of attacks while reducing false alarms, the number n' of API requests that return location $L_V$ is counted as the position estimate Li, then n'/n is calculated and compared with a threshold $\alpha$. If this number is greater than a, an alert should be raised. The intuitive idea is that the detected APs are randomly split into different sets, it is impractical for an attacker to determine how designated APs are assigned. To consistently cause false alarms on the victim side. the easiest method is to craft more designated APs. In this case, it is reasonable to raise alarms as the attacker may have sufficient capabilities to falsify the victim's location if it is desirable to them.

One application of the location spoofing attack is to mislead a car navigation system, which usually relies on GPS and Wi-Fi signals for localization results. Past research has shown that it is possible for an attacker to spoof the GPS signals of a navigation system. To minimize the discrepancies between the localization results from GPS and Wi-Fi localization systems in urban areas when GPS spoofing attack is conducted, an attacker may also want to subvert the Wi-Fi localization by launching Wi-Fi spoofing attack. The victim requests are considered a ride from ride-sharing platforms (e.g., Uber, Lyft) in an unfamiliar area with a high density of Wi-Fi APs. The victim visiting the unfamiliar area heavily relies on mobile navigation systems for localization results. It is assumed that the attacker can generate and transmit spoofing signals against GPS and Wi-Fi localization systems corresponding to any locations or navigation routes of his choice. The attacker can be a malicious Uber/Lyft driver or passenger who places a wireless spoofing device in the car. The goal of the attacker is to stealthily manipulate the location and navigation trajectory shown on the victim device and divert the victim to a target destination for malicious purposes. More specifically, given an original path from the starting point to the destination computed by the navigation software, the attacker computes a spoofing path from the current location to its desired destination, which has a similar shape as the original path. An attack example is show in FIG. 4. The victim is at location A and its destination is at location D; The spoofer sets the localization result of the victim device from A to B and forces the navigation system to generate a new route B→D (blue line). By following the navigation trajectory, the victim arrives at location C along route A→C(black line) in the physical world.

In the context of car navigation, one may differentiate legitimate and designated APs leveraging the physical-layer characteristics of Wi-Fi signals, in some examples. As such, in this task, a novel countermeasure was developed by the inventors that can effectively distinguish between legitimate and designated APs leveraging the physical layer characteristics of Wi-Fi signals in dynamic car-moving scenarios. One example approach is to utilize the Doppler effect, a well-known physical phenomenon that describes the change in frequency of a wave when an observer is in motion relative to the source of the wave. In this context, the falsified Wi-Fi signals that claim to be from the designated APs are actually transmitted by the attacker's device that is deployed stealthily inside the car, whereas the legitimate Wi-Fi signals are sent by the actual APs outside of the car. Because the victim is sitting inside the moving car, the relative velocity between the victim's device and the attacker's device is zero. Consequently, there is no observable Doppler effect between these devices. Conversely, the legitimate APs that are positioned outside the moving car, result in a relative velocity between them and the victim's device. This relative motion introduces Doppler effects in the Wi-Fi signals transmitted by the legitimate APs. Therefore, the inventors investigated the feasibility and potential of utilizing the Doppler effect in received Wi-Fi signals to determine whether the signal source is relatively static to the victim's device, enabling us to differentiate legitimate and designated APs effectively.

One challenge of the Doppler based detection is the requirement of specific hardware, such as the Universal Software Radio Peripheral. To enhance the convenience of detection, one goal is to identify additional physical layer features that can be seamlessly integrated with existing Wi-Fi chips. To achieve this, the inventors investigated the possibility of utilizing off-the-shelf Wi-Fi chips for the purposes of attack detection. By leveraging the capabilities of these readily available Wi-Fi chips, the inventors aimed to simplify the implementation of the detection algorithm significantly. This approach would eliminate the need for specialized hardware and enable the detection algorithm to be easily integrated into existing Wi-Fi systems. By exploring the potential of using off-the-shelf Wi-Fi chips, the inventors achieved a more practical and accessible solution for detecting attacks. This approach not only simplifies implementation but also ensures compatibility with existing Wi-Fi architecture, making it easier to deploy and adopt in real-world scenarios.

One physical layer feature is the variations of symbol timing offset (STO) experienced by Wi-Fi signals. STO represents the delay of a received signal relative to the expected signal. In Wi-Fi communications, symbols are used to represent binary data and are typically transmitted over a channel in a sequential manner. In an ideal scenario, the receiver would perfectly align its symbol timing with the transmitter, allowing for accurate symbol detection and decoding. However, in real-world scenarios, various factors can introduce timing errors, causing misalignment between the receiver's symbol timing and the actual transmitted symbols. This misalignment is known as STO.

As mentioned previously, the attacker's device is situated within the same car as the victim's device. Meanwhile, legitimate APs are transmitting Wi-Fi signals from different locations outside the vehicle. Due to closer position of the attacker's device compared to legitimate APs, the Wi-Fi signals emitted from the legitimate APs and received by the victim's device are more likely to experience significant distortion compared to those sent by the attacker's device. Consequently, STO encountered by the Wi-Fi signals sent by the legitimate APs may exhibit more pronounced changes than those transmitted by the attacker's device. Hence, the inventors investigated the possibility of distinguishing between legitimate and designated APs by utilizing the variations in STO measured from detected Wi-Fi signals in a dynamic car moving scenario.

Decomposing CSI Phases: The variations of STO can be measured using channel state information (CSI), which represents the combined effect of, e.g., shadowing, fading, and scattering on wireless signals during signal propagation through the wireless channels. By sending a packet with a known training sequence, the receiver captures the signal strength and phase information of each OFDM subcarrier to obtain an estimate of the channel. The inventors focused on phase information of CSI measurements because STO causes phase shifts in CSI measurements. N is denoted as the number of subcarriers in one Wi-Fi band. Assume H as the channel matrix, and a complex vector represents the CSI measurements at different subcarriers. The CSI measurement for the kth subcarrier can be expressed as Hk=|H|e−jϕk, where ok is the phase offset on subcarrier k. The reported CSI phase value ϕk from sub-carrier k can be expressed as $\phi_k=\psi k+k\cdot(\lambda_d+\lambda_s)+\varphi$, where $\lambda_d$ is the phase shift introduced by STO. It can impact CSI a $k^{th}$ subcarrier as $H_k=|H|e^{-j\cdot k\cdot\lambda_d}$, where $\lambda_d=2\pi.\ \tau_d/N$. The other three components are caused by the following factors.

$\psi_k$: the phase rotation caused by the time of flight (ToF). This phase rotation is caused by channel propagation delay from a transmitter (Tx) to a receiver (Rx). In the absence of multipath for simplicity, the phase shift of subcarrier k caused by ToF can be expressed as $\psi_k=2\pi f_k\tau_l$, where $\tau_l$ is the line-of-sight propagation time and $f_k$ is the center frequency of the kth subcarrier.

$\lambda_s$: the phase errors caused by the sampling frequency offset (SFO). SFO is caused by the offset of the sampling frequencies between the Tx and the Rx. Such a frequency offset also introduces a time shift $\tau_s$ which raises phase errors that linearly increases with the subcarrier index k. Therefore, $\lambda_s$ can be expressed as $\lambda_s=2\pi\alpha\tau_s$, where $\alpha$ is a constant. As the sampling frequency difference stays stable in the order of minutes, $\tau_s$ is considered as a constant value across different CSI sequences exchanged between a pair of the transmitter and receiver.

$\varphi$: the phase error caused by the carrier frequency offset (CFO). Ideally, the carrier frequency $f_c$ should be the same between each Tx-Rx pair for OFDM systems. However, there exists an offset between the Tx-Rx oscillators because of the hardware imperfection. Although Network interface controller compensates this offset to reduce the noise in advance, there still exists a fractional CFO, $\Delta f_c$. This fractional CFO results in a phase error Q, which can be represented as $\varphi=2\pi\Delta f_c t$. Note that CFO is independent of the subcarrier index k. According to the above analysis, $\phi_k=\psi_k+k\cdot(\lambda_d+\lambda_s)+\varphi$ can be rewritten as $\phi_k=2\pi f_k\tau_1+k(\lambda_d+\lambda_s)+2\pi\Delta f_c t$.

Estimating STO from CSI.

One goal was to measure the variations of $\lambda_d$ across CSI measurements received from a Wi-Fi AP. Specifically, one can calculate the mutual phase differences of CSI measurements and obtain a set of $\Delta\psi\kappa+k\cdot(\lambda_d+\lambda_s)+\Delta\varphi=k\cdot\Delta\lambda_d+\alpha$ for each subcarrier k, where a is a constant. A set of $k\cdot\Delta\lambda_d+\alpha$ can be obtained because $\lambda_s$ is a constant and can be removed by the deduction. Note that the wireless channels between legitimate APs and the victim device are not static. The mutual difference between ToF is combined into the mutual difference of $\lambda_d$. Next, the variations of $\Delta\lambda_d$ are measured instead of $\lambda_d$. This is because if $\lambda_d\sim N(0,\ \sigma^2)$, then $\Delta\lambda_d$ should be a Gaussian with the zero mean as well.

In some initial experiments, the inventors made use of a Raspberry Pi B4, which is an off-the-shelf Wi-Fi-capable device, to measure the variations of Add of wireless signals. Specifically, for each visible AP, the inventors collected its beacon frames using Raspberry Pi. To obtain the CSI measurement of each beacon frame, the inventors enabled the CSI extraction on Raspberry Pi using modified firmware. From the experiments, one can observe that STO changes dramatically when the wireless channels undergo variation and it changes slowly when the channels are static, the inventors performed two trials of experiments as shown in FIG. 2. The inventors took one AP to an open area, and this AP broadcasts one beacon frame every 100 milliseconds on Channel 11. Next, these frames were collected using the Raspberry Pi when the distance between the Raspberry Pi and the AP is about 1 meter and 10 meters, respectively. For each trial, the inventors collected 600 CSI measurements and calculate the mutual difference between the phase values of the CSI measurements. First, the distribution of $\Delta\lambda_d$ is shown in FIG. 2(*a*). Both lines show Gaussian distributions with zero means. The x-axis in Figure is divided into 100 bins within the range of [−0.3, 0.3] and it shows the frequency of Add falling into each bin on the y-axis. This figure shows that the variation of $\Delta\lambda_d$ when the distance is 1 meter is considerably greater than that when the distance is 10 meters. In addition, the inventors show $k\cdot\Delta\lambda_d$ versus the sub-carrier index k for 8 randomly selected CSI measurements when the distance is 1 meter and 10 meters in FIGS. 2(*b*) and 2(*c*), respectively. As a result, the $\Delta\lambda_d$ when d=100 meter changes dramatically than that when d=1 meters. This means that one can possibly differentiate legitimate APs leveraging the variations of $\Delta\lambda_d$ of received Wi-Fi signals.

Protocol Design:

Assume the victim device is at location $L_R$ and it obtains location LC from the navigation software. The detection protocol aims to verify if LC matches $L_R$, the device requests the Wi-Fi chipset to sniff Wi-Fi signals on a specific channel and extracts CSI measurements. The device calculates the mutual difference among CSI measurements from the same APs and measures the distributions of Add. Let e denote the threshold to differentiate legitimate APs. Thus, one can consider an AP as legitimate if its variation of $\Delta\lambda_d$ is greater than e. When the device identifies at least two legitimate APs, it makes a Geolocation API request with these APs to the Wi-Fi localization system and obtains the correct location $L_R$. It then matches $L_R$ with $L_C$ shown on the navigation software. If these locations significantly deviate, it raises an alarm indicating that the current location is spoofed.

Spoofing Attack Evaluation:

The effectiveness of the location spoofing attack discovered herein is shown in dense urban areas without jamming. The inventors collected public APs by conducting Wi-Fi scans every 5 seconds while driving 20 different routes in the city where the inventors conducted this research. These routes contain 10 different routes around a university campus and 10 different routes in the downtown area. The distance between the downtown and the campus is about 9 miles.

Evaluation of the Traditional Attack:

The strategy is that, given legitimate and falsified APs from location $L_R$ and $L_S$, respectively, the process evaluates if the attacker is able to fool a victim device from location $L_R$ to $L_S$ by making an API request to Google with both legitimate and falsified APs using the range-based mode. The APs detected are taken from 10 different routes close to the university campus as legitimate APs. For each route, the inventors conducted n Wi-Fi scans. Let MIR denote the set of legitimate APs visible during the i-th scan along this route, where i=1, 2, . . . , n. In the meantime, the inventors take $M^i_S$ as the set of falsified APs visible during the i-th scan along a route in the downtown area. Let $L^i_R$ and Li S indicate the locations where the inventors detect the APs in MIR and $M^i_S$, respectively. To maximize the success rate of this attack, the inventors made the size of $M^i_S$ twice that of $M^i_R$. For each trial of the experiments, the inventors then make n API requests with the corresponding APs in $M^i_S$ and $M^i_S$ for $1\leq i\leq n$.

As a result, the inventors made 348 API requests in total and only 187 out of 348 API requests return the position estimates in the downtown area. The inventors obtained the precise locations of these APs using the Learn-Then-Test (LLT) inference attack, and the inventors found that many APs from the downtown area have the same geographic locations in LLT. For a particular example, an API request with $\|M^i_R\|=24$ and $\|M^i_S\|=48$ returns the position estimate around the university campus. This means that the attacker fails to deceive the victim device around campus to get a spoofed position estimate chosen by the attacker in the downtown area. By looking into the locations of these APs in LLT, the inventors found that the 24 legitimate APs are composed of 18 APs with different geographic locations, 3 APs associated with one unique geographic location, and 3 APs that are not recorded in LLT. Hence, 24 legitimate APs form a set with 19 effective APs. By contrast, the 48 falsified APs consist of 11 APs with different geographic locations, 24 APs located at 7 unique geographic locations, and 13 APs are not recorded in LLT. Namely, 48 falsified APs form a set with 18 effective APs. Consequently, the Geolocation API returns the position estimate close to the university campus.

Evaluation of the Discovered Attack:

To evaluate the effectiveness of the discovered attack, the inventors first obtained the geographic locations of APs using the LLT inference attack. The inventors then discarded APs that do not exist in the LLT and select APs with unique locations in LLT. As a result, 6,871 out of 19,993 APs are chosen as eligible APs for the evaluation. The inventors further chose falsified APs according to the attack methodology discussed above.

Again, one goal is to fool the victim device from its current location around campus to a location near the downtown area. The inventors took APs detected from different routes close to the campus and in the downtown area as legitimate and falsified APs, respectively. For each trial of the experiments, the inventors made n API requests with the corresponding APs in $M^i_R$ and $M^i_S$. Considering the overwhelming number of APs in the downtown area, the inventors limit the number of falsified APs by setting $\|M^i_S\|\|-\|M^i_R\|<10$ in each API request. As a result, all the 348 API requests return the position estimates in the downtown area. The inventors also switched the legitimate and falsified locations, i.e., the inventors used APs detected from routes close to the downtown area and the university campus as legitimate and falsified APs, respectively. The inventors found that 3 trials of attacks fail because of the insufficient number of falsified APs. For example, in one out of three failed trials, location $L_S$ is around an industrial park with $M_S=52$ falsified APs, whereas the corresponding location $L_R$ in the downtown area has $M_R=64$ legitimate APs.

The above results show that the attacker has sufficient falsified APs against legitimate APs in most trials (e.g., 693 out of 696 trials). In rare cases where $M_R>M_S$, the inventors found the traditional attack needs to block as many legitimate APs as it can to maximize its success rate. According to the collections, 70% APs are transmitting on 6 different channels on both 2.4 GHz and 5 GHz bands in most trials. Consequentially, the traditional attack has to jam at least 6 channels by using multiple jammers simultaneously. Compared to the traditional attack, the one discovered in this paper allows the attacker to ensure $M_S>M_R$ by jamming fewer wireless channels simultaneously. For example, the attacker may only need to eliminate legitimate APs by jamming channel 1 on the 2.4 GHz band using a single jammer (20% APs occupy Channel 1 in the collections).

Evaluation of the Countermeasure:

The inventors also evaluate the effectiveness of the aforementioned Countermeasure. The inventors evaluated the threshold ε so that one can identify legitimate APs by measuring the distribution of $\Delta\lambda_d$ of each detected AP.

The inventors used a Raspberry Pi 4B to extract CSI measurements. The inventors first evaluated how the distance between Tx and Rx influences the distribution of $\Delta\lambda_d$. The inventors set an AP that broadcasts one beacon frame every 100 milliseconds on Channel 11. In the meantime, the Raspberry Pi detects the beacon frames at different locations. Assume that d is the distance between two devices, where d=1, 5, 10, . . . , 50 meters. For each experiment, the inventors took 5 seconds to collect 50 CSI measurements. Note that a mobile device takes 5 seconds to conduct a Wi-Fi scan. The inventors then computed the distribution of $\Delta\lambda_d$ by calculating the mutual difference between CSI measurements. As a result, the inventors observed that the variance of $\Delta\lambda_d$ is greater than 0.2 when d>10 meters and is less than 0.2 when d<10 meters. For example, the variance of $\Delta\lambda_d$ is less than 0.1 when d is around 1 meter. Assume that the Wi-Fi spoofer is inside the same vehicle as the victim device and the distance between two devices is less than 10 meters. The inventors took $\epsilon=0.2$.

To further validate the threshold $\epsilon=0.2$, the inventors performed another experiment in real-world scenarios. The inventors placed one ESP8266 chipset inside the vehicle as the spoofer. It broadcasts crafted localization signals to mimic multiple falsified APs on channel 11. A Raspberry Pi inside the vehicle extracts CSI measurements from the ESP8266 chipset. It also collects CSI measurements from legitimate APs operating on channel 11. The inventors then drove this vehicle for 2 miles around the campus where the inventors conducted this research. As a result, the inventors collected over 3,000 CSI measurements from the ESP8266 chipset and 156 legitimate APs. The inventors then computed the variance of $\Delta\lambda_d$ of each AP. The variance of Add of Wi-Fi signals from the ESP8266 chipset is less than 0.1 as the distance between two devices is about 1 meter. 96 out of 156 legitimate APs are identified as their variances of $\Delta\lambda_d$ are greater than 0.2. The reason for the rest APs is that the inventors did not collect sufficient CSI measurements from them. Note that the countermeasure is effective if more than two legitimate APs are identified.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for detecting falsified wireless networking signals, comprising:

a network interface, including a transceiver configured to communicate via packetized information via a wireless networking protocol;

a processor; and a memory having stored thereon a set of instructions which, when executed by the processor, cause the system to:

detect a group of first access points (APs) broadcasting wireless networking signals;

make a determination whether the group of first APs contains at least one falsified wireless networking signal;

cause the system to make a request to a localization service in relation to the group of first APs, wherein:

the request is made as part of a determination on whether the group of first APs contains at least one falsified signal, and the request includes a group of reference APs located at a known location different from the location of the group of first APs;

when a determination is made that the group of first APs does contain at least one falsified wireless networking signal, perform an analysis of each AP of the group of first APs using at least one of: a pair-wise comparison of AP locations, or an analysis of physical layer attributes of the signals broadcasted by each AP of the group of first APs;

identify which APs of the group of first APs is falsified; and initiate a mitigating action relative to the falsified APs that are identified.

2. The system of claim 1, wherein an amount of reference APs in the group of reference APs is one less than an amount of first APs in the group of first APs.

3. The system of claim 1, wherein the group of reference APs is determined to coordinate with a known protocol of the localization service.

4. The system of claim 3, wherein the group of reference APs comprises a number, a location dispersant, or a signal strength attribute that, when processed by the localization service in combination with corresponding attributes of the group of first APs, will produce an expected result if there are no falsified APs and an unexpected result if there are falsified APs.

5. The system of claim 1, wherein identifying which APs of the group of first APs is falsified is a different process than making a determination whether the group of first APs contains at least one falsified signal.

6. The system of claim 5, wherein identifying which APs of the group of first APs is falsified comprises performing a pair-wise comparison of locations corresponding to the group of first APs.

7. The system of claim 6, wherein a plurality of AP pairs is grouped and sent to a geolocation server in a set of requests to identify and isolate any deviations from expected location and ascribe the deviations to a specific AP.

8. The system of claim 5, wherein the instructions further cause the system to perform an analysis on one or more physical layer attributes.

9. The system of claim 8, where the instructions further cause the system to identify a Doppler shift in the wireless networking signals.

10. The system of claim 1, wherein the mitigation action comprises at least one of: disconnect the transceiver from falsified APs or save information associated with falsified APs.

11. A method for detecting falsified wireless networking signals, the method comprising:

detecting a group of first access point (APs) broadcasting wireless networking signals;

grouping a plurality of AP pairs;

sending the grouped plurality of AP pairs to a geolocation server in a set of requests;

identifying and isolating any deviations from an expected location;

ascribing the deviations to a specific AP among the plurality of AP pairs;

determining whether the group of first APs contains at least one falsified wireless networking signal;

upon determining that the group of first APs does contain at least one falsified wireless networking signal, performing an analysis of each AP of the group of first APs using at least one of: a pair-wise comparison of AP locations, or an analysis of physical layer attributes of the signals broadcasted by each AP of the group of first APs;

identifying which APs of the group of first APs is falsified; and initiating a mitigating action relative to the falsified APs that are identified.

12. The method of claim 11, further comprising:

initiating a request to a localization servicer in relation to the group of first APs, wherein the request is made as a part of a determination on whether the group of first APs contains at least one falsified signal, and wherein the request includes a group of reference APs located at a known location different from the location of the group of first APs.

13. The method of claim 12, further comprising:

determining the group of reference APs to coordinate with a known protocol of the localization service, wherein the group of reference APs comprises a number, a location dispersant, or a signal strength attribute that, when processed by the localization service in combination with corresponding attributes of the group of first APs, will produce an expected result if there are no falsified APs and an unexpected result if there are falsified APs.

14. The method of claim 11, wherein identifying which APs of the group of first APs is falsified is a different process than determining whether the group of first APs contains at least one falsified signal.

15. The method of claim 14, further comprising performing an analysis on one or more physical layer attributes.

16. The method of claim 15, further comprising identifying a Doppler shift in the wireless networking signals.

17. The method of claim 11, wherein the mitigation action comprises at least one of: disconnecting a transceiver from falsified APs or saving information associated with falsified APs.

* * * * *